United States Patent [19]

Pescher et al.

[11] Patent Number: 5,914,040

[45] Date of Patent: Jun. 22, 1999

[54] PROCESS FOR THE PURIFICATION OF A MEDIUM CONTAINING ORGANIC WASTE

[75] Inventors: Yvette Pescher, Bagneux, France; Jean-Paul Raes, Braine-Le-Comte, Belgium; Sylvain Danda, Marly-La-Ville, France; Bernard Castelas, Montanay, France; François Rabatel, Caves, France; José Morales, Olaira, France; Jean Bonfill, Olaira, France

[73] Assignee: Rhone-Poulenc Chimie, Courbevoie, France

[21] Appl. No.: 08/682,707

[22] PCT Filed: Feb. 1, 1995

[86] PCT No.: PCT/FR95/00113

§ 371 Date: Oct. 14, 1997

§ 102(e) Date: Oct. 14, 1997

[87] PCT Pub. No.: WO95/21136

PCT Pub. Date: Aug. 10, 1995

[30] Foreign Application Priority Data

Feb. 1, 1994 [FR] France ................................. 94/01093

[51] Int. Cl.⁶ ....................................................... C02F 1/56
[52] U.S. Cl. .......................... 210/638; 210/639; 210/650; 210/713; 210/721; 210/727; 210/728; 210/730; 210/734; 210/905; 210/906; 210/916
[58] Field of Search ..................... 210/609, 638, 210/639, 650, 651, 712, 713, 721, 725, 727, 728, 747, 730, 734, 735, 903, 905, 906, 916

[56] References Cited

U.S. PATENT DOCUMENTS

| 4,173,532 | 11/1979 | Keoteklian | 210/727 |
|---|---|---|---|
| 4,482,459 | 11/1984 | Shiver | 210/639 |
| 5,028,337 | 7/1991 | Linder et al. | 210/642 |
| 5,071,566 | 12/1991 | Papp et al. | 210/713 |
| 5,190,654 | 3/1993 | Bauer | 210/490 |
| 5,531,907 | 7/1996 | Williams et al. | 210/727 |
| 5,558,775 | 9/1996 | Busch, Jr. | 210/638 |

FOREIGN PATENT DOCUMENTS

| 54-139258 | 10/1979 | Japan . |
|---|---|---|
| 56-136694 | 10/1981 | Japan . |
| 1-051200 | 2/1989 | Japan . |
| 2056962 | 3/1981 | United Kingdom . |
| WO 92/11206 | 7/1992 | WIPO . |

*Primary Examiner*—Peter A. Hruskoci
*Attorney, Agent, or Firm*—Katherine L. Carleton; Jean-Louis Seugnet

[57] ABSTRACT

The present invention relates to a process for the purification of a medium containing organic waste. The process according to the present invention is characterized in that the starting medium (or effluent) containing the organic waste is subjected to the following stages: (i) treatment with at least one oxidizing agent; (ii) treatment with at least one flocculating agent; (iii) treatment with at least one polyelectrolyte, and in that the effluent obtained on conclusion of all of these stages is subjected to a filtration stage (iv), whereby a filtration cake and a filtrate are obtained. The process according to the present invention is more particularly useful for the treatment of pig manure.

32 Claims, No Drawings

PROCESS FOR THE PURIFICATION OF A MEDIUM CONTAINING ORGANIC WASTE

The application is a 371 of PCT/FR95/00113 filed Feb. 1, 1995.

The present invention relates to a process for the purification of a medium containing organic waste.

It also relates to the application of the said process to the treatment of organic dejecta, in particular liquid animal manures, especially liquid pig manure.

It also relates to the application of this process to the treatment of other effluents, such as the effluents arising from the production of olive oils and the effluents arising from the production of wine (for example, the waste water resulting from the cleaning of wine vats).

The treatment of waste, in particular of organic type, for the purpose of removing it and/or of recovering it, is a requirement which is becoming increasingly felt in the industrial and agricultural world of today.

Thus, the high production of waste water of agricultural origin, in particular from liquid animal manures, poses increasingly severe problems in agriculture and also in the protection of the natural environment, in particular of water courses. Increasingly strict regulations are in place in order to prevent the highly negative effects of pollution of water courses due to various liquid animal manures.

A certain number of treatment processes have been proposed.

It is known to treat liquid animal manures by aerobic biological fermentation in order to provide for oxidation of the malodorous sulphur-containing combinations.

It is also known to treat fermentable and malodorous waste using oxidizing agents.

It has already been proposed to sterilize municipal waste using gas containing nitrous gases.

Likewise, the possibility of destroying the putrid compounds contained in household refuse by means of gas containing nitrogen oxides has been mentioned in the past.

Nevertheless, these processes for the purification of a medium (or effluent) containing organic waste do not give entirely satisfactory results from a technical and even economic viewpoint.

This is in particular the case for purification treatments for liquid animal manures in conventional total oxidation plants.

Likewise, the drying of complete liquid manure by evaporation of the water which it contains is not economically viable, causes air pollution and is troublesome to the sense of smell.

The known processes for the purification of a medium (or effluent) containing organic waste also have the disadvantage of not treating all of this waste but only certain kinds of waste. Moreover, not all waste can be recovered.

The present invention intends in particular to solve the abovementioned disadvantages.

With this aim, the present invention proposes to provide a process for the purification of a medium (or effluent) containing organic waste, in which the said medium is subjected to a combination of specific chemical, physical or physicochemical treatments, all the organic waste contained in this medium being treated and, preferably, no unrecovered waste remaining on conclusion of the process, which process is simple and economic to implement.

Moreover, the discharge to the natural environment (water courses, irrigation, and the like) of the aqueous part of the effluents treated according to the invention becomes possible because it is advantageously odourless, clear, sterile and relatively depleted in BOD (biological oxygen demand) and COD (chemical oxygen demand).

Finally, the process according to the present invention makes it possible, in particular in the case of the treatment of liquid animal manures (in particular liquid pig manure), to obtain sludges which can be spread directly, that is to say which can be used directly as agricultural fertilizer without it being necessary to add fertilizing adjuvants thereto.

Thus, the main subject of the invention is a process for the purification of a medium containing organic waste, characterized in that it comprises an oxidation treatment (in particular of chemical type), a flocculation treatment, a treatment using a polyelectrolyte (in particular of the anionic or cationic type), a filtration and, preferably, an ultrafiltration.

Another subject of the invention consists of the application of the said process in purifying media (or effluents) containing organic dejecta, in particular organic dejecta of human origin, or liquid animal manures, in particular from animals of bovine, ovine or porcine type or from poultry.

The applications of the said process to the treatment of effluents arising from the production of olive oils and to the treatment of effluents arising from the production of wine, in particular of waste water resulting from the cleaning of wine vats, form other subjects of the invention.

Other aims, details and advantages of the invention will be better understood on reading the description which will follow.

The process according to the present invention is characterized in that the starting medium (or effluent) containing the organic waste is subjected to the following stages:

(i) treatment with at least one oxidizing agent;
(ii) treatment with at least one flocculating agent;
(iii) treatment with at least one polyelectrolyte, and in that the effluent obtained on conclusion of all of these stages is subjected to a filtration stage
(iv), whereby a filtration cake and a filtrate are obtained.

According to the invention, the stage (i) is carried out before or simultaneously with the stage (ii) and the stage (ii) is carried out before or simultaneously with the stage (iii).

According to a first embodiment of the invention, the stages (i) and (ii) are carried out simultaneously: the medium (or effluent) containing the organic waste is thus first treated simultaneously with at least one oxidizing agent and at least one flocculating agent; the effluent obtained on conclusion of this simultaneous treatment is then subjected to the stage (iii), that is to say treated with at least one polyelectrolyte; the effluent obtained on conclusion of the stage (iii) is finally subjected to the filtration stage (iv), whereby a filtration cake and a filtrate are obtained.

According to a second embodiment of the invention, the stages (ii) and (iii) are carried out simultaneously: the medium (or effluent) containing the organic waste is thus first treated with at least one oxidizing agent (stage (i)); the effluent obtained on conclusion of the stage (i) is then treated simultaneously with at least one flocculating agent and at least one polyelectrolyte; the effluent obtained on conclusion of this simultaneous treatment is finally subjected to the filtration stage (iv), whereby a filtration cake and a filtrate are obtained.

According to a third embodiment of the invention, the stages (i), (ii) and (iii) are carried out simultaneously: the medium (or effluent) containing the organic waste is thus treated simultaneously with at least one oxidizing agent, at least one flocculating agent and at least one polyelectrolyte; the effluent obtained on conclusion of this simultaneous treatment is then subjected to the filtration stage (iv), whereby a filtration cake and a filtrate are obtained.

According to a fourth embodiment of the invention, the stages (i), (ii) and (iii) are carried out separately from one another: the process according to the invention then comprises the following successive stages:

(i) the said medium is treated using at least one oxidizing agent;

(ii) the effluent obtained on conclusion of the stage (i) is treated using at least one flocculating agent;

(iii) the effluent obtained on conclusion of the stage (ii) is treated using at least one polyelectrolyte;

(iv) the effluent obtained on conclusion of the stage (iii) is subjected to a filtration, whereby a filtration cake and a filtrate are obtained.

In all the cases, at least part of the filtrate obtained on conclusion of the stage (iv) can, optionally, be recycled in the stage (i).

Nevertheless, according to a preferred alternative form of the process of the invention, applicable in particular to all the embodiments of the invention described above, the process comprises a stage (v) in which this filtrate obtained on conclusion of the stage (iv) is not recycled in the stage (i) but is advantageously subjected to an ultrafiltration, whereby a retentate (or concentrate) and an ultrafiltrate (or permeate) are obtained.

In this alternative form of the invention, the retentate is preferably recycled in the stage (i).

Each of the treatments or stages of the process according to the invention will now be described more precisely.

Any type of oxidizing agent (preferably chemical) can be employed in the stage (i).

The oxidizing agent used is preferably (but non-limitingly) chosen from the group formed by oxygen, oxygenated derivatives (for example, hydrogen peroxide or ozone), chlorine, chlorinated derivatives (for example, chlorine dioxide, sodium hypochlorite, calcium hypochlorite, potassium hypochlorite, sodium chlorite, sodium chlorate or bleach) or potassium permanganate.

A mixture of oxidizing agents can be employed.

The amount of oxidizing agent employed in the stage (i) is, in general, between 0.1 and 50 liters, preferably between 0.5 and 10 liters, per $m^3$ of organic waste (present in the starting medium to be treated).

Use will advantageously be made of bleach as oxidizing agent; the amount of bleach then employed in the stage (i) is then generally between 0.1 and 5 litres, preferably between 0.5 and 1 liter, per $m^3$ of organic waste (present in the starting medium to be treated).

The stage (i) can be carried out with stirring.

The Applicant Company has found that the treatment carried out during the stage (i) makes it possible in particular to oxidize fine hydrophilic colloids and to remove sulphur-containing compounds, in particular hydrogen sulphide ($H_2S$), possibly present in the medium to be treated.

Moreover, it makes it possible to obtain a medium (or effluent) which is, at least in large part, disinfected and deodorized.

The stage (ii) is a flocculation treatment carried out using at least one flocculating agent, preferably an inorganic flocculating agent.

The flocculating agent used can be of the cationic type.

The flocculating agent of the cationic type capable of being used is preferably (but non-limitingly) an iron salt, an aluminium salt or a magnesium salt.

This iron salt can correspond to the following formula (1):

$$Fe_2Cl_x(SO_4)_y \quad (1)$$

in which $0 \leq a \leq 5, 0 \leq b \leq 6, 0 \leq c \leq 3$ and $a+b+2c=6$.

Likewise, this aluminium salt can correspond to the following formula (2):

$$Al_2(OH)_a Cl_b(SO_4)_c \quad (2)$$

in which $0a \leq 5, 0 \leq b \leq 6, 0 \leq c \leq 3$ and $a+b+2c=6$.

The flocculating agent of the cationic type can be chosen from the group formed by ferrous chloride, ferrous sulphate, ferric chloride, ferric sulphate, chlorinated ferric sulphate, aluminium sulphates, chlorinated basic aluminium sulphates, magnesium chloride or magnesium sulphate.

A mixture of flocculating agents of the cationic type can be employed.

The flocculating agent used can be of the anionic type.

The flocculating agent of the anionic type capable of being used is preferably (but non-limitingly) sodium aluminate or calcium aluminate.

A mixture of flocculating agents of the anionic type can be employed.

The amount of flocculating agent employed in the stage (ii) is generally between 1 and 20 kg, preferably between 2 and 10 kg, per $m^3$ of organic waste (present in the starting medium to be treated).

The stage (ii) is preferably carried out with stirring.

The flocculating agent must generally be chosen so that its use does not cause decarbonatation due to the decomposition of the carbonates and hydrogencarbonates possibly present in the effluent to be treated; it is generally sufficient for the value of the pH of the reaction medium not to fall below that of the pH for destabilization of the carbonates and hydrogencarbonates.

During the stage (ii), the flocculating agent, when it is of the cationic type, can also be used in the presence of at least one polyelectrolyte of the cationic type.

The polyelectrolytes of the cationic type capable of being employed in the present invention are in particular:

neutral polyamines and quaternary polyamines; mention may more precisely be made of neutral or quaternary polyalkyleneamines and polyhydroxyalkyleneamines; the following homopolymers are particularly suitable: polyethyleneamine, poly(2-hydroxy-1-propyl-N-methylammonium chloride), poly(2-hydroxy-1-propyl-1-N-dimethylammonium chloride), poly(vinyl-2-imidazolinium hydrogensulphate) and poly(diallyldimethylammonium chloride); mention may also be made of the copolymer formed by acrylamide and diallyldimethylammonium chloride;

polyaminoacrylates and polyaminomethacrylates and more precisely poly(dialkylaminoalkyl acrylate)s and poly(dialkylaminoalkyl methacrylate)s; by way of example, neutral or quaternary poly(N,N-dimethylaminoethyl methacrylate) is well suited, whether in the form of a homopolymer or of a copolymer with acrylamide;

polyaminoacrylamides and polyaminomethacrylamides and more precisely polydialkylaminoalkylacrylamides or methacrylamides; by way of examples, mention may be made of poly(N,N-dimethylaminopropylmethacrylamide)s and poly(N,N-dimethylaminoethylacrylamide)s.

A mixture of polyelectrolytes of the cationic type can be used.

The amount by weight of polyelectrolyte of the cationic type capable of being employed in stage (ii), when the flocculating agent is of the cationic type, generally represents 0.1 to 5%, preferably 0.1 to 1%, of the amount by weight of flocculating agent (of the cationic type) employed in this stage.

The flocculation treatment makes it possible in particular to lower the amount of colloids still present.

Moreover, the Applicant Company has found that this stage results in the precipitation of the compounds based on phosphates and those based on phosphorus and generally of nitrogenous protein compounds and, also, in a decrease in the BOD and in the COD.

The stage (iii) is a treatment using at least one polyelectrolyte.

In particular when the flocculation agent used in the stage (ii) is of the cationic type or of the anionic type, the polyelectrolyte employed in the stage (iii) in advantageously a polyelectrolyte of the anionic type.

The polyelectrolyte of the anionic type capable of being employed is preferably (but non-limitingly) an anionic polyacrylamide, a polyacrylate, a polymethacrylate, a polycarboxylate, a polysaccharide (for example, xanthan gum, guar gum or alginate) or chitosan.

A mixture of polyelectrolytes of the anionic type can be employed.

When the flocculation agent used in the stage (ii) is of the anionic type, the polyelectrolyte employed in the stage (iii) can also be a polylectrolyte of the cationic type.

A polyelectrolyte of the cationic type as described above can then be used.

The amount of polyelectrolyte employed in the stage (iii) is generally between 1 and 100 grams, preferably between 2 and 20 grams, expressed as weight of dry polyelectrolyte, per $m^3$ of organic waste (present in the starting medium to be treated).

The stage (iii) can be carried out with stirring.

The Applicant Company has in particular found that, by virtue of the removal of the colloids, in particular of the fine hydrophilic colloids, and of the sulphur-containing compounds, in particular of hydrogen sulphide, the effluent obtained on conclusion of this stage (iii) is essentially formed of a sludge which can be directly dewatered, via a filtration, and which is completely deodorized.

The effluent obtained on conclusion of the stage (iii) is then subjected to a filtration operation (stage (iv)).

A filtration cake and a filtrate are thus obtained.

The filtration operation is a technique well known to a person skilled in the art.

It is carried out by means of any appropriate filter. Use will preferably be made of a device which is simple (as regards its design and its maintenance) and economic as regards energy, for example a filter of cloth drum type.

The filtration cake obtained on conclusion of the filtration stage (iv) is preferably, in particular in the case of the treatment of organic dejecta such as liquid animal manures (in particular liquid pig manure), composed of sludges containing all the phosphorus possibly present initially in the medium to be treated, which sludges can be spread directly, that is to say can be used as is as agricultural fertilizer, without any problem of smell. The amount of nitrogen in ammoniacal form present in the said sludges is preferably greatly reduced with respect to that present in the starting medium to be treated.

At least part of the filtrate obtained on conclusion of the stage (iv) can optionally be recycled in the stage (i).

However, according to a preferred alternative form of the process of the invention, the filtrate obtained on conclusion of the stage (iv) is, on the contrary, advantageously subjected to an ultrafiltration operation (stage (v)).

A retentate (or concentrate) and an ultrafiltrate (or permeate) are then obtained.

The ultrafiltration operation is a technique well known to the person skilled in the art and belongs to the separative membrane techniques in which the driving force for the transfer is a pressure gradient.

It is, in this instance, carried out by means of any appropriate ultrafiltration device.

The ultrafiltration employed in the present invention can be frontal or, preferably, tangential. In the latter case, the operating principle generally consists in causing the effluent to be treated to move under pressure along a membrane which is permeable to the solvent but impermeable to the solutes which it is desired to retain.

The membrane employed for carrying out the ultrafiltration operation in the process according to the invention can be organic or inorganic.

It can be homogeneous, asymmetric or composite. A membrane is said to be asymmetric when the permselective layer only represents a very fine thickness of the membrane; in contrast, the homogeneous membrane constitutes in its entirety the permselective layer; a specific case of an asymmetric membrane is the composite membrane obtained by depositing the permselective layer on a preexisting support.

The configuration of the membrane employed is, for example, multichannel or, preferably, tubular or planar.

Its cutoff threshold is generally between 0.001 and 0.2 $\mu$m.

It is possible in particular to employ, as membrane in the context of the invention, a zirconia membrane deposited on an alumina support or, preferably, a carbon support (for example with a cutoff threshold of 0.14 $\mu$m) or a carbon membrane deposited on a support based on carbon fibres.

A membrane based on polyacrylonitriles can also be employed.

The use of an inorganic membrane deposited on a ceramic support can be envisaged.

An inorganic ultrafiltration membrane such as described in French Patent Application No. 92/09138 can thus be used.

The Applicant Company has found that the ultrafiltrate (or permeate) obtained on conclusion of the ultrafiltration stage (v) is odourless and also sterile, clear and highly depleted in BOD and COD.

Consequently, this ultrafiltrate can not only be conveyed into water treatment plants but can also be directly discharged into the natural environment: it can be poured into water courses or used to irrigate crops; part of this ultrafiltrate can optionally be recycled in the stage (iii).

The retentate (or concentrate) obtained on conclusion of the ultrafiltration stage (v) is preferably recycled in the stage (i).

Thus, no unrecovered waste remains on conclusion of this alternative form of the process according to the invention.

The process according to the invention can be carried out continuously.

The process according to the invention can be used for purifying media (or effluents) containing organic dejecta, in particular organic dejecta of human origin, or liquid animal manures, in particular from animals of bovine, ovine or porcine type or from poultry. It is, for example, advantageously employed for the treatment of liquid pig manure and can be used directly on the site of the agricultural operation concerned.

The process according to the invention can also be applied to the treatment of effluents arising from the production of olive oils and to the treatment of effluents arising from the production of wine, in particular waste water resulting from the cleaning of wine vats.

What is claimed is:

1. A process for the purification of a liquid animal manure, comprising the following stages:
   (i) treating said manure with at least one oxidizing agent to oxidize fine hydrophilic colloids and remove sulfur-containing compounds in said manure;
   (ii) treating said manure with at least one inorganic flocculating agent to precipitate phosphorus and nitrogen protein compounds, and decrease BOD and COD in said manure;
   (iii) treating said manure with at least one polyelectrolyte to remove colloids and form an effluent containing a sludge which can be directly dewatered by filtration;
   (iv) subjecting the effluent obtained upon carrying out the above stages (i), (ii) and (iii) to a filtration stage, whereby a filtration cake and a filtrate are obtained; and
   (v) subjecting said filtrate to an ultrafiltration stage, whereby a retentate and an ultrafiltrate are obtained.

2. A process according to claim 1, wherein the stages (i) and (ii) are carried out simultaneously.

3. A process according to claim 1, wherein the stages (ii) and (iii) are carried out simultaneously.

4. A process according to claim 1, wherein the stages (i), (ii) and (iii) are carried out simultaneously.

5. A process according to claim 1, comprising the following successive stages:
   (i) treating said manure with at least one oxidizing agent;
   (ii) treating the effluent obtained on conclusion of the stage (i) with at least one inorganic flocculating agent;
   (iii) treating the effluent obtained on conclusion of the stage (ii) with at least one polyelectrolyte;
   (iv) subjecting the effluent obtained on conclusion of the stage (iii) to a filtration, whereby a filtration cake and a filtrate are obtained; and
   (v) subjecting to an ultrafiltration the filtrate obtained on conclusion of the stage (iv), whereby a retentate and an ultrafiltrate are obtained.

6. A process according to claim 1, wherein the retentate obtained on conclusion of stage (v) is recycled in stage (i).

7. A process according to claim 1, wherein the ultrafiltrate obtained on conclusion of the stage (v) is directly discharged to the natural environment.

8. A process according to claim 1, wherein the filtration cake obtained on conclusion of the stage (iv) is composed of sludges.

9. A process according to claim 1, wherein the oxidizing agent is selected from the group consisting of oxygen, oxygenated derivatives, chlorine, chlorinated derivatives and potassium permanganate.

10. A process according to claim 1, wherein the oxidizing agent is selected from the group consisting of oxygen, hydrogen peroxide, ozone, chlorine, chlorine dioxide, sodium hypochlorite, calcium hypochlorite, potassium hypochlorite, sodium chlorite, sodium chlorate, bleach and potassium permanganate.

11. A process according to claim 10, wherein the oxidizing agent is bleach.

12. A process according to claim 1, wherein the stage (ii) is carried out with stirring.

13. A process according to claim 1, wherein said flocculating agent is a flocculating agent of the cationic type.

14. A process according to claim 13, wherein said flocculating agent is an iron salt, an aluminium salt or a magnesium salt.

15. A process according to claim 14, wherein said flocculating agent is an iron salt corresponding to the following formula (1):

$$Fe_2Cl_x(SO_4)_y \qquad (1)$$

wherein $0 \leq x \leq 6, 0 \leq y \leq 3$ and $x+2y=6$
or an aluminium salt corresponding to the following formula (2):

$$Al_2(OH)_a Cl_b(SO_4)_c \qquad (2)$$

wherein $0 \leq a \leq 5, 0 \leq b \leq 6, 0 \leq c \leq 3$ and $a+b+2c=6$.

16. A process according to claim 13, wherein said flocculating agent is selected from the group consisting of ferrous chloride, ferrous sulphate, ferric chloride, ferric sulphate, chlorinated ferric sulphate, basic aluminium sulphates, chlorinated basic aluminium sulphates, magnesium chloride and magnesium sulphate.

17. A process according to claim 13, wherein the treatment of the stage (ii) is carried out using at least one flocculating agent of the cationic type and wherein the treatment of the stage (iii) is carried out using at least one polyelectrolyte of the cationic type.

18. A process according to claim 17, wherein said polyelectrolyte of the cationic type is a neutral polyamine or a quaternary polyamine.

19. A process according to claim 1, wherein said flocculating agent is a flocculating agent of the anionic type.

20. A process according to claim 19, wherein said flocculating agent is sodium aluminate or calcium aluminate.

21. A process according to claim 1, wherein said polyelectrolyte used in the stage (iii) is a polyelectrolyte of the anionic type.

22. A process according to claim 21, wherein said polyelectrolyte of the anionic type is selected from the group consisting of an anionic polyacrylamide, a polyacrylate, a polymethacrylate, a polysaccharide, chitosan and a polycarboxylate.

23. A process according to claim 1, wherein said polyelectrolyte used in the stage (iii) is a polyelectrolyte of the cationic type.

24. A process according to claim 23, wherein said polyelectrolyte of the cationic type used in the stage (iii) is a neutral polyamine or a quaternary polyamine.

25. A process according to claim 1, wherein the filtration is carried out by means of a filter of cloth drum type.

26. A process according to claim 1, wherein the ultrafiltration consists of a tangential ultrafiltration.

27. A process according to claim 26, wherein the ultrafiltration is carried out by means of a membrane having a cutoff threshold of between 0.001 and 0.2 µm.

28. A process according to claim 27, wherein the ultrafiltration is carried out by means of a membrane of tubular or planar configuration.

29. A process according to claim 26, wherein the ultrafiltration is carried out by means of a zirconia membrane deposited on a carbon or alumina support or a carbon membrane deposited on a support based on carbon fibers.

30. A process according to claim 26, wherein the ultrafiltration is carried out by means of a membrane based on polyacrylonitriles.

31. A process according to claim 26, wherein the ultrafiltration is carried out by means of an inorganic membrane deposited on a ceramic support.

32. A process according to claim 1, wherein said medium is pig manure.

* * * * *